United States Patent [19]
Halberstadt et al.

[11] Patent Number: 5,654,346
[45] Date of Patent: *Aug. 5, 1997

[54] LOW DENSITY THERMOPLASTIC FOAM

[75] Inventors: Louis Halberstadt, Andover; Peter E. Mertinooke, Amesbury, both of Mass.; Joseph V. Perry, Chester, N.H.; Dan C. Muessel, Danvers, Mass.

[73] Assignee: Amesbury Industries, Inc., Manchester-by-the-Sea, Mass.

[*] Notice: The term of this patent shall not extend beyond the expiration date of Pat. No. 5,393,796.

[21] Appl. No.: 673,572

[22] Filed: Jul. 1, 1996

Related U.S. Application Data

[60] Continuation of Ser. No. 394,597, Feb. 27, 1995, which is a division of Ser. No. 255,324, Jun. 7, 1994, Pat. No. 5,393,796, which is a continuation of Ser. No. 924,405, Aug. 3, 1992, which is a continuation of Ser. No. 378,003, Jul. 11, 1989.

[51] Int. Cl.⁶ .......................................... C08J 9/00
[52] U.S. Cl. ..................... 521/134; 521/79; 521/81; 521/139; 521/140
[58] Field of Search ..................... 521/134, 79, 81, 521/139, 140

[56] References Cited

U.S. PATENT DOCUMENTS

| | | |
|---|---|---|
| 3,624,964 | 12/1971 | Bordner et al. |
| 3,814,779 | 6/1974 | Wiley. |
| 3,827,841 | 8/1974 | Kawai et al. |
| 4,049,760 | 9/1977 | Lozach. |
| 4,107,260 | 8/1978 | Dougherty. |
| 4,130,535 | 12/1978 | Coran et al. |
| 4,181,647 | 1/1980 | Beach. |
| 4,185,416 | 1/1980 | Wilmes. |
| 4,222,729 | 9/1980 | Ragazzini et al. |
| 4,238,260 | 12/1980 | Washkewicz. |
| 4,308,352 | 12/1981 | Knaus. |
| 4,311,628 | 1/1982 | Abdou-Sabet et al. |
| 4,328,273 | 5/1982 | Yackiw. |
| 4,401,612 | 8/1983 | Nehmey et al. |
| 4,401,783 | 8/1983 | Kotian. |
| 4,409,165 | 10/1983 | Kim. |
| 4,409,365 | 10/1983 | Coran et al. |
| 4,532,260 | 7/1985 | MacKeighen et al. |
| 4,535,564 | 8/1985 | Yackiw. |
| 4,537,825 | 8/1985 | Yardley. |
| 4,538,380 | 9/1985 | Colliander. |
| 4,559,095 | 12/1985 | Babbin. |
| 4,585,035 | 4/1986 | Piccoli. |
| 4,593,062 | 6/1986 | Puydak. |
| 4,600,728 | 7/1986 | MacKeighen et al. |
| 4,616,052 | 10/1986 | Habibullah. |
| 4,652,475 | 3/1987 | Haney et al. |
| 4,654,262 | 3/1987 | Alonso. |
| 4,656,785 | 4/1987 | Yackiw. |
| 4,668,319 | 5/1987 | Piccoli. |
| 4,694,627 | 9/1987 | Omholt. |
| 4,708,351 | 11/1987 | Midooka et al. |
| 4,730,416 | 3/1988 | Eames. |
| 4,742,646 | 5/1988 | Kehrli. |

FOREIGN PATENT DOCUMENTS

| | | |
|---|---|---|
| 852 096 | 9/1978 | Canada. |
| 1 177 212 | 11/1984 | Canada. |

OTHER PUBLICATIONS

"Extrusion of Processing SANTOPRENE® Thermoplastic Rubber", Monsanto Technical Paper.
"Extrusion Foaming Technology for SANTOPRENE® Thermoplastic Rubber, Revised", Monsanto Technical Paper.
"Foam Extrusion Technology for TP Elastomer", Plastic Technology, Feb. 1987.
"Plastics Extrusion Technology Handbook", Sidney Levy, P.E. (1923).

*Primary Examiner*—Morton Foelak
*Attorney, Agent, or Firm*—Testa, Hurwitz & Thibeault, LLP

[57] ABSTRACT

A process and apparatus are described for extruding a soft, low density elastomeric thermoplastic foam. A single screw extruder having a very large screw length to diameter ratio is provided to thoroughly mix the thermoplastic elastomer with a blowing agent. A thin, substantially taperless die is also provided to form extruded profiles. By using such a process and apparatus, a variety of complex-shaped extruded profiles may be easily produced.

6 Claims, 4 Drawing Sheets

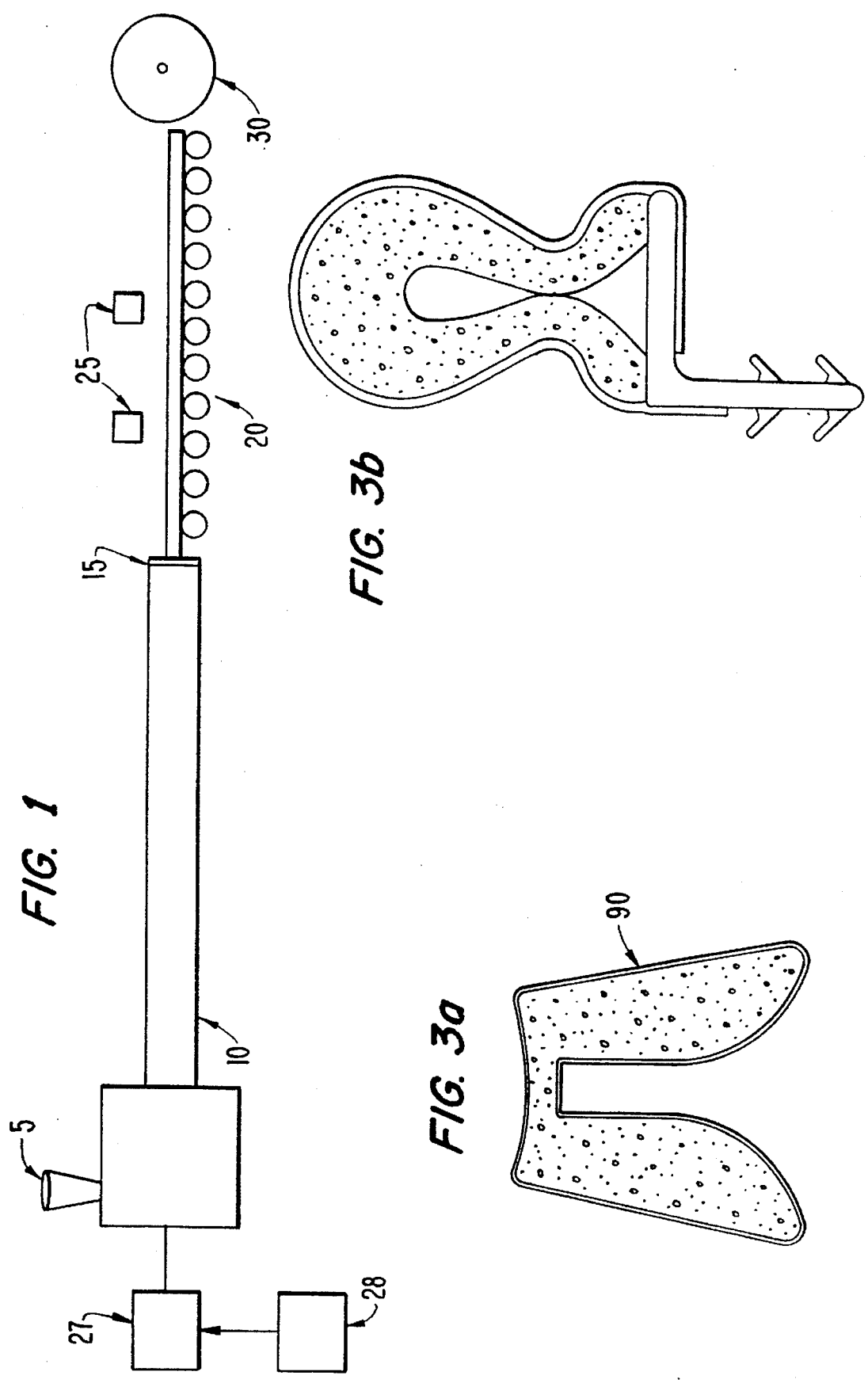

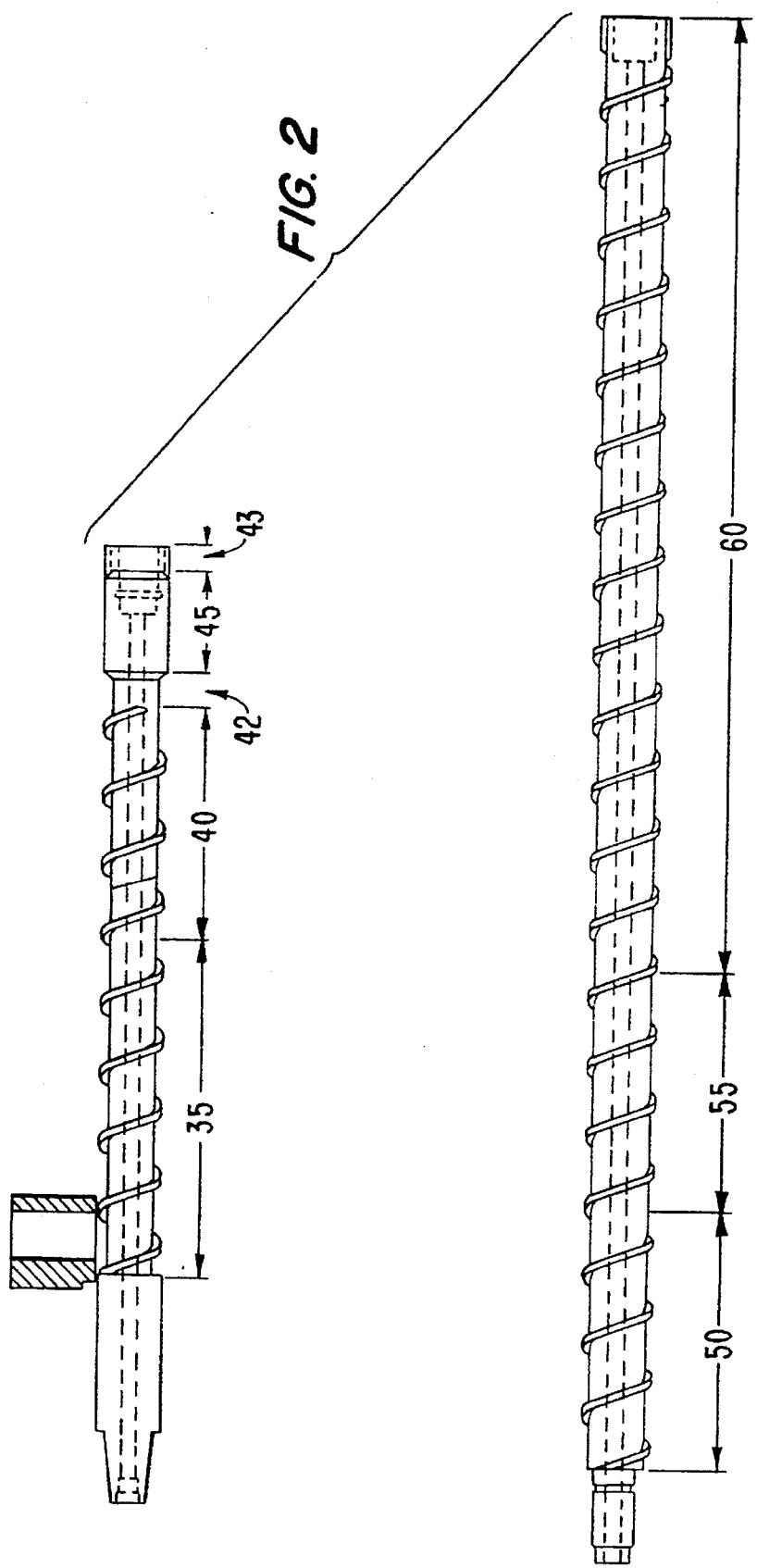

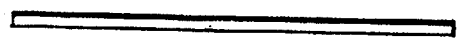
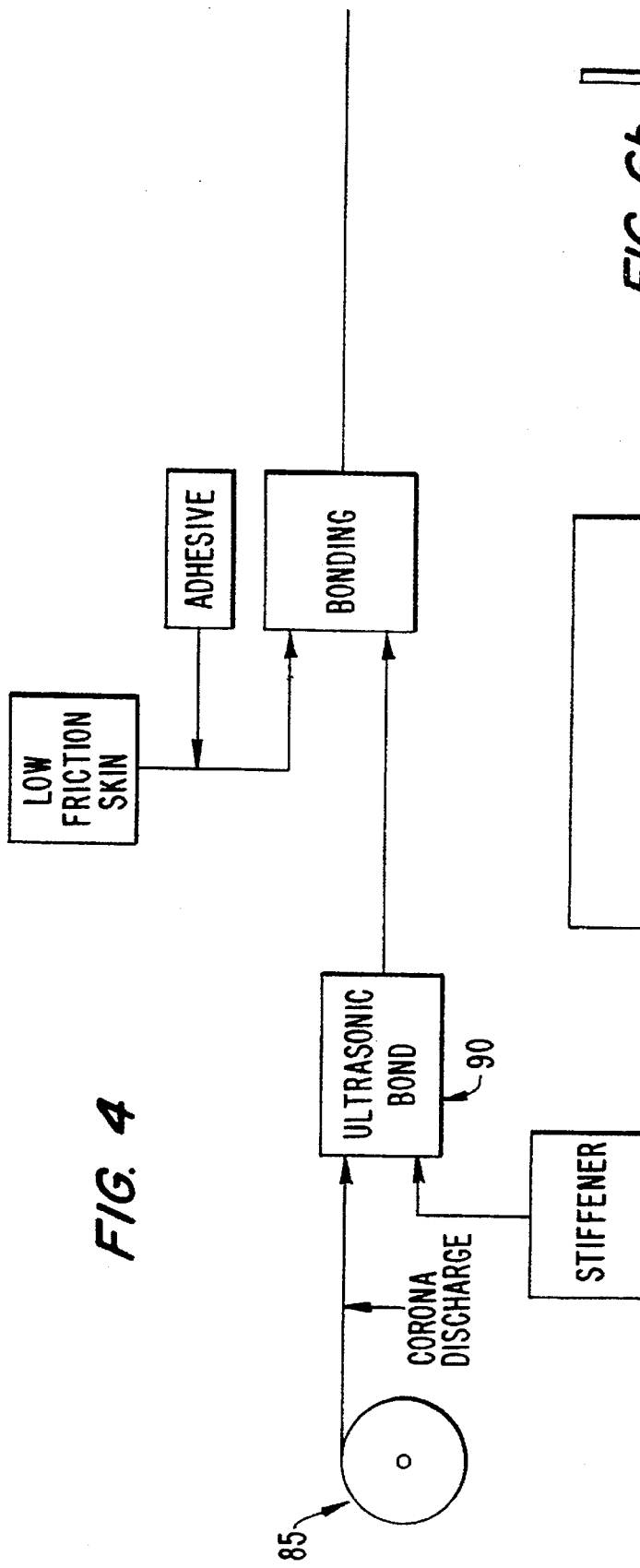
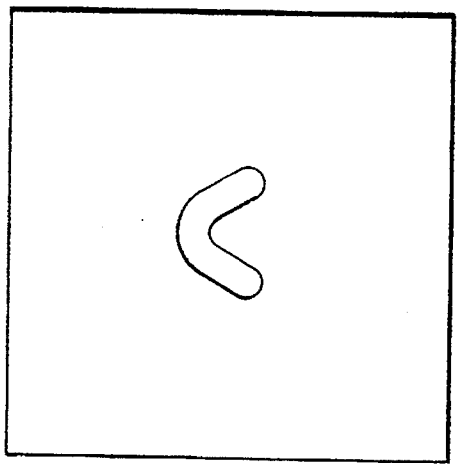

LOW DENSITY THERMOPLASTIC FOAM

This is a continuation of U.S. Ser. No. 08/394,597 (filed Feb. 27, 1995), which is a divisional of U.S. Ser. No 08/255,324 (filed Jun. 7, 1994, issued as U.S. Pat. No. 5,393,796), which is a continuation of U.S. Ser. No. 07/924,405, (filed Aug. 3, 1992) which is a continuation of U.S. Ser. No. 07/378,003 (filed Jul. 11, 1989).

TECHNICAL FIELD

This invention generally relates to the extrusion of an elastomeric thermoplastic foam and, in particular, to a single screw extruder for producing a low density foam having improved characteristics.

BACKGROUND OF THE INVENTION

According to conventional technique, a thermoplastic foam may be produced by feeding a thermoplastic resin into an extruder and, through the shearing action of one or more screws, melting the resin continuously in the barrel of the extruder. In an intermediate or a mixing section, a blowing agent, usually in a liquid or gaseous state, is continuously injected into the molten resin. In some instances, a chemical blowing agent may be dispersed throughout the particulate resin in a powder form before the resin is fed to the extruder as discussed in U.S. Pat. No. 4,107,260. In either case, the extruder screw is designed to mix and dissolve the blowing agent as uniformly as possible in the molten resin. Thorough, uniform mixing is essential to the production of a high quality foam. The resultant mixture must be maintained under carefully controlled temperatures and pressures within the extruder in order to prevent the volatilization of the blowing agent. When the molten mixture is forced through a die, the material undergoes decompression to atmospheric pressure so that the blowing agent separates within the body of material as bubbles. If the temperature is too high, there is overexpansion and the cells rupture. If the temperature is too low, there is incomplete expansion, resulting in a low quality foam. In many instances, the temperature window between overexpansion and underexpansion is only a few degrees Fahrenheit.

In many applications, it is desirable to use a low density foam. Among the areas where a low density foam proves useful are insulation and weatherstripping. In general, weatherstrips are used to seal joints or spaces between doors and windows to stop infiltration of air, rain, snow, and other elements. Effective weatherstripping serves to reduce heating costs in winter and cooling costs in summer. A weatherstrip must have certain characteristics to produce an effective seal. First, it should have a good resistance to compression set. Compression set resistance refers to the ability of a material to resume its initial shape after being subjected to a compressible load. Failure to do so may result in an uneven seal, reducing the effectiveness of the weatherstrip. Second, a weatherstrip must be soft and yielding, i.e. it must be easily compressible. This ensures that the door or window can be closed without the need for excessive force and still compress the weatherstrip sufficiently to form the necessary seal. Finally, it is desirable that a weatherstrip be lightweight, i.e. have a low density.

Some these properties have been achieved in prior art weatherstrip products by the use of polyurethane foam materials. Polyurethane foams, however, have a number of significant disadvantages in the manufacture of weatherstrip products. Most importantly, polyurethane foams are not thermoplastic, which results in the need for expensive molding techniques. These molding techniques cannot be easily adapted to products of different cross sections and any waste generated cannot be reused. Another disadvantage of polyurethane foams is their high percentage of open cells which results in undesirable uptake of water, e.g. rain. These water absorption properties deleteriously affect the performance of the polyurethane foam weatherstrip product in adverse weather conditions.

Thus, a low density thermoplastic foam which is easily compressible and has a good compression set resistance would serve as a good weatherstrip. To produce lightweight foams, a substantial percentage of blowing agent must be introduced into the molten resin. Because of the amount of blowing agent required for a low density foam, thorough mixing and cooling of the molten mixture becomes an even more pronounced problem. In general, as the molten material passes through the extruder, the temperature increases due to the combined shear and compressive forces applied to the material by the rotating extruder screw. The magnitude of the temperature increase varies according to the rotation rate of the extruder screw and the shear properties of the resin being used.

One method to control the temperature increase would be to lower The screw speed, but this would result in a decreased production rate. U.S. Pat. No. 4,222,729 interposes a cooling/mixing device between the extrusion head and the screw barrel of the extruder. However, while such devices do increase cooling, there is still a problem of achieving a truly uniform temperature distribution. It is also common to employ a tandem extruder, i.e. a second extruder coupled to the primary extruder which serves to cool the molten mixture. The second extruder is generally larger and has a screw or screws rotating at a lower velocity than the primary extruder. This configuration suffers from several serious drawbacks. First, since the second extruder is independently driven, it requires separate drive and control mechanisms which can double the overall equipment costs. Second, it is necessary to provide a good seal at the point where the second extruder is driven. These seals are very expensive and frequently ineffective. It is therefore desirable to provide an extrusion apparatus which overcomes these difficulties.

In the Monsanto Company publication "Extrusion Foaming Technology for SANTOPRENE® Thermoplastic Rubber", a method is described for producing extrusions of foamed SANTOPRENE® with densities of foam 12–44 lbs/ft$^3$. A tandem extruder system is used with the primary extruder employed for plasticating and for fluorocarbon addition. The downstream extruder, usually one size larger, functions mainly as a cooling and mixing extruder. High pressure crossover piping is used to connect the two machines. However, as noted above, a tandem extruder Is generally more expensive and complicated to operate. Any low density foams that can be produced by the described method can only be produced when hard grades of the thermoplastic elastomeric material are used. Because of the increased stiffness and poorer compression set resistance of harder grades of the material, any resulting foams are unsuitable for use as a weatherstrip.

SUMMARY OF THE INVENTION

Accordingly, it is an object of the present invention to produce an improved soft, low density elastomeric foam having thermoplastic properties, good compression set resistance and low water absorption.

It is another object of this invention to provide an improved weather seal using such a low density foam.

It is another object of this invention to provide a method for producing an improved low density foam product.

It is another object of this invention to provide an apparatus for producing an improved low density foam product.

It is still another object of this invention to provide an apparatus which may be easily configured to produce a variety of relatively complex-shaped soft, low density foam products.

It is still another object of this invention to provide an inexpensive die which may be easily manufactured to shape the extruded foam product.

The above objects may be achieved by providing a process which comprises first selecting a foamable thermoplastic elastomer having a hardness value sufficiently low to enable the production of a soft foam weatherseal. This thermoplastic elastomer is then fed into an extruder barrel where it is compressed and melted by the action of a screw. A blowing agent is introduced into the melted thermoplastic elastomer early enough to permit extended mixing in a metering region. The backflow of the blowing agent is prevented. The melted thermoplastic elastomer and the blowing agent are thoroughly mixed and then cooled to a uniform, predetermined temperature. The mixture is then forced through a die to form an extruded profile.

The present invention also relates to a single screw extruder for producing a soft, low density elastomeric thermoplastic foam including a screw contained in an extruder barrel and having an $L/D$ ratio of at least 32:1 for compressing and melting a thermoplastic elastomer. A means is provided for injecting a blowing agent into the melted thermoplastic elastomer as well as a means for preventing the backflow of said blowing agent in order to permit the early introduction of the blowing agent. A means for thoroughly mixing the blowing agent into the melted thermoplastic elastomer is provided on the screw to produce a uniform mixture. A die forms the uniform mixture to a desired shape.

The invention also relates to a weatherseal having a soft, low density elastomeric thermoplastic foam profile with a density less than 20 lbs/ft$^3$ and being formed from a thermoplastic elastomer having a durometer reading of less than 65. A means for attaching the weatherseal to a structure is bonded along the length of the foam profile. A thin, low friction skin is bonded to at least part of the surface of the foam profile.

The invention also relates to a weatherseal having a soft, low density elastomeric thermoplastic foam profile with a density less than 20 lbs/ft$^3$ and being foamed from a Thermoplastic elastomer having a durometer reading of 65 or less. A thin, self-lubricating skin is bonded to at least a part of the surface of the foam profile.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

FIG. 1 is a schematic diagram illustrating the method and apparatus of the present invention.

FIG. 2 shows the extruder screw used in the present invention.

FIGS. 3a and 3b are illustrative embodiments of profiles which may be extruded according to the present invention.

FIG. 4 is a schematic diagram illustrating a method of producing a kerf-mounted weatherseal according to the present invention.

FIGS. 6a and 6b are a plan view and a cross-sectional view of a die used with the present invention.

DETAILED DESCRIPTION

Figure 5:
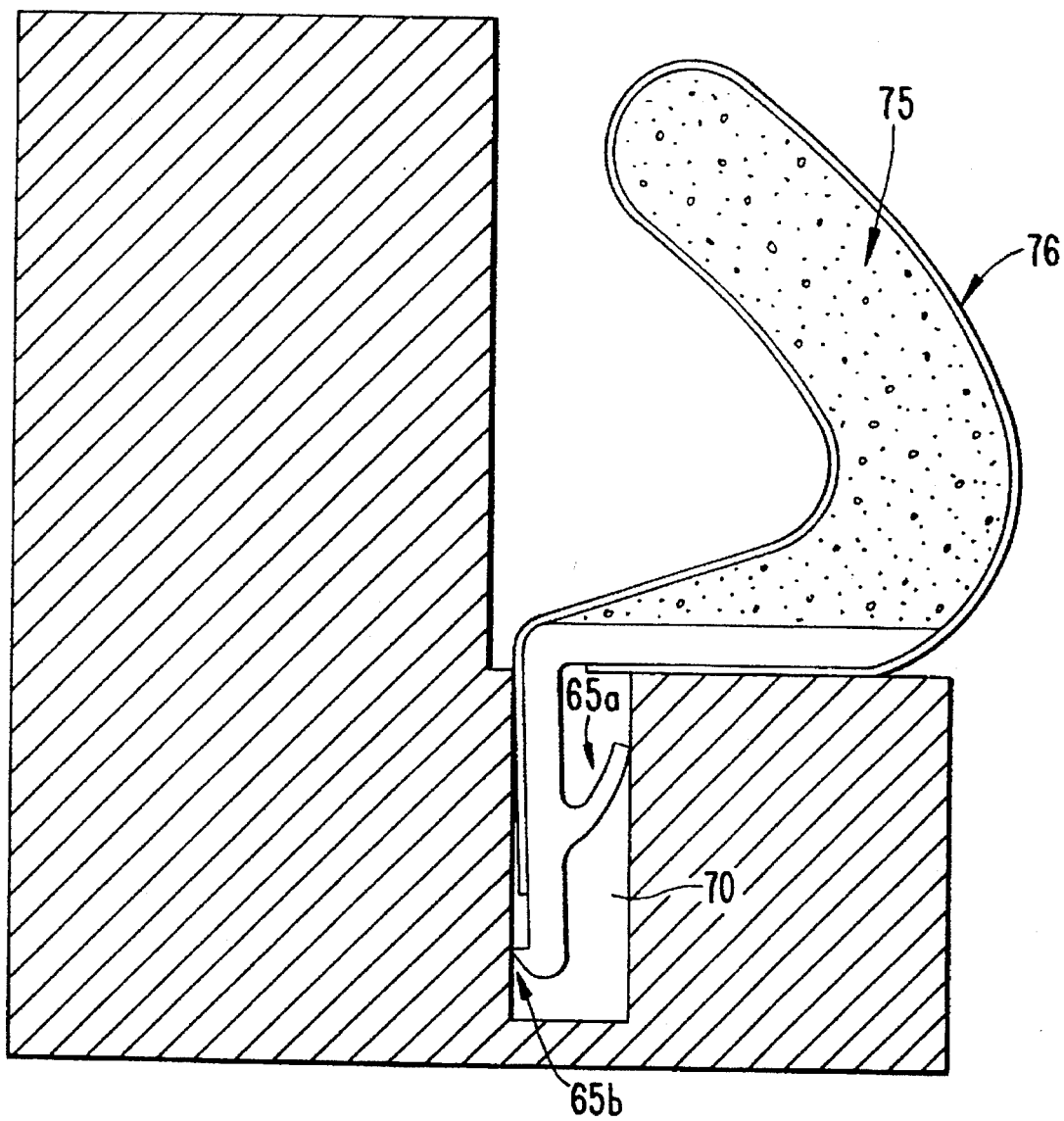
FIG. 5 is a cross-sectional view of a preferred embodiment of a kerf-mounted weatherseal.

SANTOPRENE® is an elastomeric thermoplastic rubber which may be foamed to produce extruded tubing and profiles. The characteristics and properties of SANTOPRENE® are described in U.S. Pat. Nos. 4,130,585 and 4,311,628 assigned to Monsanto Company. It has physical characteristics with the potential to meet or exceed many elastomers such as neoprene or EPDM rubber. However, the prior art has only been able to foam soft grades (e.g. durometer readings of 64 or lower) of SANTOPRENE® down to densities of about 20 lbs/ft$^3$. Grades of elastomer hardness are typically measured by a durometer. Hardness values are normally provided by the material supplier. For example Monsanto provides SANTOPRENE® in grades such as 72, 64, 55 and the like with higher numbers representing harder materials. Details of grading elastomers in this fashion are well known in the art and are described in ASTM D2240. In addition, the higher density soft foam products produced with SANTOPRENE® have only been extruded in simple symmetric profiles. Thus, the prior art has been unable to take advantage of the physical characteristics of SANTOPRENE® for applications such as weatherseals, where it is necessary to use a soft foam with a density less than 20 lbs/ft$^3$ which may be produced in a variety of shapes.

While the process and apparatus of this invention generally will be described with regard to SANTOPRENE®, the invention may generally be applied to any elastomeric thermoplastic and should not be understood as limited in this respect.

The first step in the process of the present invention involves the selection of a foamable thermoplastic elastomer having a suitable hardness value to permit production of a soft, low density foam. In practice the resulting foam must exhibit compressibility (i.e. load bearing) characteristics that permit the foam to deform easily under the pressures employed to close a door or window and still resist permanent deformation (compression set) when the load is removed. For SANTOPRENE® elastomers, grades of durometer readings should be 64 or lower to achieve the proper characteristics of softness and compression set resistence. Selection of comparable hardness grades for other thermoplastic elastomers can be readily determined by reference to the teachings of this invention.

The range of densities to which the soft grades of SANTOPRENE® should be foamed for use as a weatherseal is from about 2 to about 19 lbs/ft$^3$, with good results being obtained with a foam of from about 5 to about 16 lbs/ft$^3$. In the preferred embodiment, a SANTOPRENE® foam with a density of from about 8 to about 10 lbs/ft$^3$ is used. It should be noted that the ideal density for a good weatherseal may depend on the particular geometry of the seal itself and of the object to be sealed, e.g. a door or window. As a comparison, polyurethane foam is typically used at a density of about 6 lbs/ft$^3$ for weatherseal applications. As indicated above, foamed, soft, low density SANTOPRENE® has several key advantages over polyurethane. First, since polyurethane foam is formed by a continuous molding operation, the entire molding operation must be changed to produce different shapes. To change the shape of the foam extrusion involves a simple change of dies. Second, thermoplastic foams such as SANTOPRENE® may be heat welded, an advantageous characteristic in any application where the profile is to be attached to another structure. Heat welding also permits the fusion of the ends of SANTOPRENE® extrudates during installation so that there are no gaps when weatherstrip pieces join e.g. at corners. The physical characteristic which permits the heat welding also permits any defective foam extrudate to be ground up and reused in the extrusion process. In addition, because of the heat welding capability, a weatherstrip may be sealed to itself in cross-section as shown in FIG. 3b. Finally, foamed, low density SANTOPRENE® has a much smaller percentage of open cells than urethane, meaning that SANTOPRENE® absorbs much less moisture, an important feature for a good weatherseal. In addition, foamed, low density SANTOPRENE® has a very good compression set resistance and is among the most flexible of the thermoplastics.

That is unique about the SANTOPRENE® foam weatherstrip product of this invention is its combination of softness (i.e. good compressibility), low density, good compression set resistance, and thermoplastic properties. The prior art does not teach how to achieve these characteristics. While the prior art has been able to foam SANTOPRENE® at densities comparable to the present invention, this has only been achieved with harder grades (e.g. durometer reading of 72 or more) of the thermoplastic elastomer which are unsuitable for weatherstripping applications. One is not able to foam soft grade SANTOPRENE® (e.g. durometer reading of 64 or less) at low densities using conventional techniques. Thus, no one has been able to take advantage of the materials' physical properties in a weatherstrip. Using the method and apparatus of the present invention, one is able to foam a soft grade thermoplastic elastomer suitable for use as a weatherstrip.

FIG. 1 depicts an extrusion apparatus for extruding a thermoplastic elastomer according to this invention. Beads of SANTOPRENE® are placed in a hopper 5 from where they are fed by gravity into the extruder barrel 10. Motor 27 drives the extruder and is regulated by controls 28. Cramming mechanisms known in the prior art may be used to force the beads into the extruder barrel, although such mechanisms are not necessary. After introduction to the extruder barrel 10, the resin beads are compressed, melted, mixed with a blowing agent and forced through a die 15. At this point, the molten mixture undergoes decompression and a foam profile is produced corresponding to the die configuration. Subsequently, the extruded profile is passed onto a conveyor 20 for cooling. Fans 25 may or may not be provided to facilitate cooling. The cooled extrudate is subsequently reeled up on roll 30. The process and apparatus will now be described in greater detail with reference to the remaining Figures.

FIG. 2 depicts a 2.5 inch diameter extruder screw used in the preferred embodiment of the present invention. The screw consists of a feed region 35, a transition region 40, open regions 42 and 43, a blister region 45, a reduced region 50, a transition region 55, and a metering region 60. The screw shown is manufactured in two sections which may be joined by a coupling mechanism 56.

After introduction to the extruder barrel 10, the material enters feed region 35 of constant flight depth. In the preferred embodiment of the 2.5 inch screwy, the flight depth is 0.297 inches and the feed region extends for 12.50 inches. These numbers should not be understood as limiting, but rather are the results of finding the material parameters necessary to achieve good results. The depth is also limited by the amount of steel wall remaining after a flight is created, a large flight depth possibly resulting in a broken screw at operating temperatures and pressures. The feed region 35 acts simply to convey the resin forward, as is conventional. Some melting of the resin may take place, but it is insignificant.

From feed region 35 the resin material is forced into transition region 40. In the preferred embodiment of the 2.5 inch screw, the flight depth decreases uniformly from 0.297 inches to 0.097 inches and transition region 40 extends for 28.75 inches. The flight depth at the end of the transition region 40 should be one-third that of feed region 35 in order to achieve a 3 to 1 compression ratio. In general for this process, the compression ratio should be between 2.5 and 3.5. Screws with higher compression ratios can produce too much shear and overheat the material. A compression ratio lower than 2.5 may not produce sufficient shear for uniform melts. The transition region acts to mix, heat and most importantly melt the thermoplastic resin. It is imperative that the resin be completely melted before leaving transition region 40.

From transition region 40 the material passes through open region 42 with no flights before encountering blister 45. The open region 42 simply allows the molten resin to redistribute itself. The blister region 45 extends for one flight and serves as a choke to prevent the seepage of the blowing agent back through extruder barrel 10. Its use is important since it is unlikely that enough back pressure has been built up by the resin to prevent the backflow of the blowing agent. The positioning of blister region 45 is an essential feature of this invention. In order to produce a low density foam, a substantial percentage of a blowing agent, generally around 10% by weight based on the polymer charge, must be mixed with the molten resin. In general blowing agent content may be from about 5% to about 15% and in the preferred embodiment, is from about 10% to about 12% by weight based on the polymer charge. Because of this large amount of blowing agent, an adequate amount of length must be provided to thoroughly mix all of the blowing agent. Without enough mixing, the blowing agent will be distributed non-uniformly resulting in a low quality foam when the molten resin expands as it passes through the die. Blister region 45 allows for the introduction of a blowing agent relatively early in the extrusion process so that an elongated metering region 60, to be discussed below, may be provided.

From blister region 45, the material passes through open region 43 which is provided to prevent surging of the molten material. The material then passes to reduced region 50 having a constant flight depth of 0.107 inches and extending for 7.50 inches on the 2.5 inch screw. It is in reduced region that the blowing agent is introduced to the molten resin. The flight depth in this region is somewhat arbitrary, the depth being chosen to provide a reduced pressure area so that the blowing agent is not injected into a very high pressure region. Typically, the blowing agent is injected at pressures from about 1500 to about 3000 psi. The pumping system works less because of this reduced pressure region. Chlorinated fluorocarbon blowing agents are preferred, although almost any non-solid blowing agent may be used including pentane, nitrogen and carbon dioxide. Chlorinated fluorocarbon 11 is used in the preferred embodiment. The molten resin in reduced region 50 has the blowing agent introduced, homogeneously mixed and dispersed, and ultimately dissolved therein. A true solution of a liquid polymer and chlorinated fluorocarbon 11 is obtained.

From reduced region 50, the molten mixture passes through a transition region 55 which couples reduced region 50 to metering region 60. Its main purpose is To provide a smooth transition between these two regions. The mixture is then fed into elongated metering region 60 having with a constant flight depth of 0.097 inches and extending for 63.75 inches in the preferred embodiment of the 2.5 inch screw. The flight depth here is chosen with regard to the compression ratio and the length must be enough to ensure proper mixing and cooling. The early flights of metering region 60 are for mixing while the later flights are for cooling. In addition to external temperature controls, the front end of the screw is cooled by a coolant passing through a central bore along the screw length.

The length of metering section 60 is substantially greater than that normally employed in extrusion processes. This length should be sufficient to provide for the thorough mixing of all the material and the attainment of a uniform temperature profile in the material. Inadequate length results in a poor quality foam product. In general the requisite length, which can be conveniently referenced to by the $L/D$ (screw length to diameter) ratio, will vary depending on the thermoplastic elastomer and its degree of hardness. In general, a minimum $L/D$ ratio of about 32:1 is necessary to achieve good low density foams according to the present invention. Typically, $L/D$ ratios of from about 40:1 to about 60:1 are suitable for most thermoplastic elastomers. For soft grades of SANTOPRENE® the preferred $L/D$ ratio is about 48:1.

The mixing is enhanced by the use of mixing pins arranged in rings across the flight channel to break up laminar flow. In the preferred embodiment, a series of continuous flight-interrupted ring configurations is alternated with interrupted flight-continuous ring configurations. The last two configurations are interrupted flight-continuous ring.

After leaving elongated metering section 60, the material is forced through a die 15. At the die, it is critical that the blowing agent be thoroughly mixed with the melted resin, that the pressure be above a certain minimum value, and that the temperature of the melt be within a certain window. In the preferred embodiment using SANTOPRENE®, the pressure should be at least 250 psi, although this value may vary with the blowing agent used. The extrusion temperature must be in a window from 295°–340° F. to produce a good smooth foam product. Table I shows several temperature profiles for the 2.5 inch extruder screw at different operating speeds.

The dies used in the present invention differ significantly from those used in the conventional foaming of thermoplastic elastomers. Conventional dies have included tapered lands to provide laminar flow into the die, i.e. to ensure that there are no abrupt changes in the direction of flow. It was also thought to be necessary to have a land length short enough to minimize pressure drop and premature foaming but long enough to withstand system pressures and form the profile thoroughly. With such a die system, however, only simple symmetric profiles could be produced. It now has been found that contrary to the conventional wisdom, the use of a thin, substantially taperless die results in a high-quality foam and may be used to produce complex profiles. In addition, such dies are much less expensive than conventional dies and can greatly reduce production costs while providing the ability to produce foam products having a variety of shapes.

After the material has been foamed, it passes onto conveyor 20 for cooling. In the preferred embodiment this conveyor is about 60 feet in length. Fans 25 may be provided at various points along the conveyor to facilitate cooling, although they are not absolutely necessary. It should be noted that the extrudate may not be passed into a trough of water as is sometimes done in the prior art since the foamed SANTOPRENE® of this invention floats and thus would result in differential cooling and distortion of the extrudate. At the end of the conveyor, the extrudate is wound up on reel 30.

A particularly preferred extrudate profile will now be described with reference to FIGS. 4, 5 and 6. FIG. 6 illustrates a die configuration which may be used to produce a foam profile suitable for use as a doorseal. An air jet is positioned beneath the extrudate as it leaves the die to provide cool air to prevent the extrudate from collapsing and adhering to itself. FIG. 5 illustrates the product of this embodiment attached to a structure. Barbs 65a and 65b serve to securely retain the weatherstrip in kerf 70. Foam profile 75 is covered at least in part by a thin skin which provides a low friction contact for a door or window. This skin may comprise any low friction polymer and in the preferred embodiment is polyethylene.

The process of production construction of this preferred embodiment will now be described with reference to FIG. 4. The foam product produced in accordance with the process illustrated in FIG. 1 is unwrapped from reel 85 and is subjected to a corona discharge treatment to enhance its bonding ability. The foam is then ultrasonically bonded to a stiff crier as is schematically illustrated at 90. As will be appreciated this step is possible because of the thermoplastic nature of the foamed product. Prior art non-thermoplastic foams cannot take advantage of this processing technique. The foam/stiffener configuration then has a low friction skin adhesively bonded to at least part of its outer surface. It is important that the low friction skin not cover the point of attachment of the stiffener, i.e. the barbs. This ensures that the barbs are able to dig into a door jamb or other structure effecting the secure attachment of the weatherstrip.

As shown in FIG. 3a, the stiffener may be omitted, the extruded foam profile simply having a low friction skin 90 bonded to at least a part of its surface.

TABLE I

|  | Flight No. | 27 RPM | 50 RPM |
| --- | --- | --- | --- |
| TEMP ZONE 1 | 0–8.15 | 320° F. | 320° F. |
| TEMP ZONE 2 | 8.15–13.8 | 340 | 350 |
| TEMP ZONE 3 | 13.8–19.4 | 390 | 350 |
| TEMP ZONE 4 | 19.4–25.3 | 390 | 350 |
| TEMP ZONE 5 | 25.3–31.1 | 390 | 350 |
| TEMP ZONE 6 | 31.1–36.7 | 390 | 350 |
| TEMP ZONE 7 | 36.7–42.4 | 330 | 310 |
| TEMP ZONE 8 | 42.4–48.2 | 330 | 295 |
| END CLAMP | — | 365 | 340 |
| DIE | — | 365 | 365 |

According to the present invention, a soft, high quality, low density elastomeric thermoplastic foam may be produced. The best prior art foaming techniques were able to produce simple profiles of such foams down to a density of 20 lbs/ft$^3$. The present invention permits the foaming of complex profiles at a density of 10 lbs/ft$^3$. This results in lower overall production costs and enables the use of a thermoplastic elastomer for weatherseal purposes.

By soft is meant a foam having good load bearing (compressibility) properties. Typically loads of from about 0.75 to 1.5 are the maximum that one would want a door or window closure to require. Accordingly the soft foams products of this invention should be defoamed by at least about 50% under such loads. The range of densities to which the soft grades of SANTOPRENE® should be formed for use as a weatherseal is from about 2 to about 19 lbs/ft³, with good results being obtained with a foam of about 5 to about 16 lbs/ft³. A soft grade SANTOPRENE® foam with a density of about 8 to about 10 lbs/ft³ provides the best results. Such densities reduce cost and enhance weatherseal characteristics. The present invention also produces a foam having a good compression set resistance. There is a low percentage of open cells in the foam produced, e.g. typically less than about 10%. Because of the teachings of the present invention, extruded foam profiles of complex shapes may be formed.

The present invention is able to achieve these enhanced low density foam characteristics because of the unique combination of elements comprising the extrusion process and apparatus. An unusually long metering region is provided to more thoroughly mix the greater amount of blowing agent into the melted resin because a blister region prevents backflow of the blowing agent when insufficient back pressure has been developed. This blister and elongated metering region in turn reduce the pressure at the die which permits the use of thin, metallic plate having a substantially taperless aperture formed therein as a die. The use of a thin plate for the die imparts both diversity and economy to the apparatus. The dies are inexpensive to produce and may be readily interchanged to form a variety of extruded profiles. The apparatus may thus be readily configured to create profiles suitable for many weatherseal applications.

EXAMPLE

SANTOPRENE® having a durometer reading of 64 was supplied to the hopper of the single screw extruder schematically illustrated in FIG. 1. Within the extruder barrel was the screw depicted in FIG. 2. At a point after the blister 12% by weight of chlorinated fluorocarbon 11 was added to the melted SANTOPRENE®. The temperature and pressure at the die were 365° F. and 250 psi, respectively at a screw rotation of 27 RPM. The melted SANTOPRENE®/blowing agent mixture was forced through the die pictured in FIG. 6 to produce a foamed profile.

While the foregoing description is directed to only presently preferred embodiments, it will be obvious to one of ordinary skill that numerous modifications may be made without departing from the true spirit or scope of the invention which is to be limited only by the appended claims.

We claim:

1. An elastomeric thermoplastic foam, comprising a blend of a polyolefin resin and a vulcanized monoolefin copolymer rubber; wherein said foam has a density of less than about 20 lbs/ft³, and wherein said foam is extruded from a thermoplastic resin having a Shore A hardness of less than 72.

2. An elastomeric foam according to claim 1, further comprising a thin, low friction skin bonded to at least part of the surface of said foam.

3. The foam according to claim 2, wherein said skin comprises polyethylene.

4. The foam according to claim 2, wherein the density of said foam is between about 2 and about 19 lbs/ft³.

5. The foam according to claim 2, wherein said foam is attached to a stiffener.

6. The foam according to claim 5, wherein said stiffener comprises polypropylene.

* * * * *